United States Patent [19]
Ishida

[11] Patent Number: 5,877,915
[45] Date of Patent: Mar. 2, 1999

[54] VENTILATION STRUCTURE OF A COVER FOR A DISK DRIVE

[75] Inventor: Katsuaki Ishida, Kawasaki, Japan

[73] Assignee: Fujitsu Limited, Kawasaki, Japan

[21] Appl. No.: 739,177

[22] Filed: Oct. 30, 1996

[30] Foreign Application Priority Data

Oct. 30, 1995 [JP] Japan .................................. 7-281913

[51] Int. Cl.⁶ ............................ G11B 33/08; G11B 33/14
[52] U.S. Cl. ...................................................... 360/97.03
[58] Field of Search ........................... 360/97.02, 97.03; 361/687, 685, 690, 692, 693

[56] References Cited

U.S. PATENT DOCUMENTS

| Re. 34,497 | 1/1994 | Blanks | 360/97.02 |
|---|---|---|---|
| 4,863,499 | 9/1989 | Osendorf | 360/97.02 |
| 5,030,260 | 7/1991 | Beck et al. | 55/316 |
| 5,214,549 | 5/1993 | Baker et al. | 360/97.02 |
| 5,235,482 | 8/1993 | Schmitz | 360/97.02 |
| 5,307,222 | 4/1994 | Dion | 360/97.02 |
| 5,537,270 | 7/1996 | Morehouse et al. | 360/97.02 |

FOREIGN PATENT DOCUMENTS 60-147983   8/1985   Japan .
4-349291   12/1992   Japan .

Primary Examiner—Jefferson Evans
Attorney, Agent, or Firm—Greer, Burns & Crain Ltd.

[57] ABSTRACT

A breather structure for ventilation between the inside and outside of the housing of the disk drive is realized by a simple, inexpensive construction. The cover structure is for a disk drive provided on a base with a spindle motor carrying recording disks and an actuator for driving a carriage carrying heads for writing information on the disks, with the inside sealed airtight by attaching a cover to the gas through a gasket, and with an antivibration plate for preventing vibration and noise from generating when driving the disks at the surface of the cover contacting the outside air either directly or through a viscoelastic member. A ventilation groove for ventilating between the inside and outside of the disk drive is realized by forming a breather passage designed considering the passage conductance between the cover and the antivibration plate, providing a breather vent communicating the breather passage with the outside in the antivibration plate at one end of the breather passage, and providing a breather vent communicating the breather passage with the inside of the disk drive at the cover at the other end.

11 Claims, 12 Drawing Sheets

Fig.1A
PRIOR ART
Fig.1B
PRIOR ART
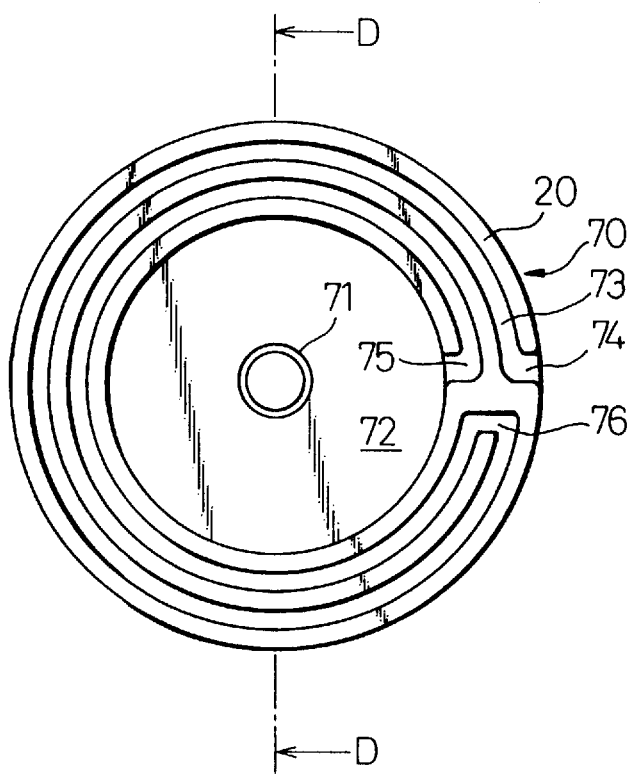
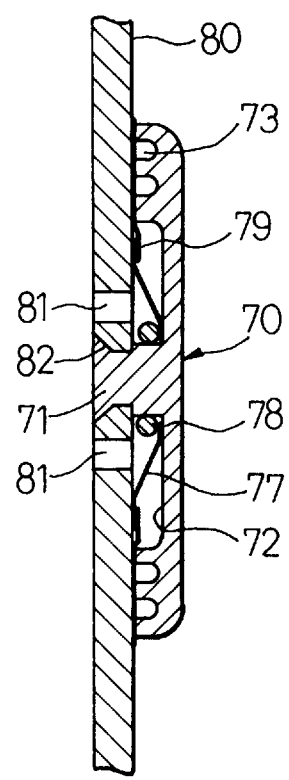

X = 0.2 (mm)
Y = 5 (mm)
Z = 30 (mm)

VENTILATION STRUCTURE OF A COVER FOR A DISK DRIVE

BACKGROUND OF THE INVENTION

1. Field of the Invention

The present invention relates to a ventilation structure of a cover for a disk drive, more particularly to a ventilation structure of a cover for a magnetic disk drive designed so that air can circulate between the inside and outside of the disk drive.

2. Description of the Related Art

In recent years, magnetic disk drives, optical disk drives, and other disk drives have been used as storage devices for computers. These disk drives are used in various environments together with the computers. Accordingly, when leaving a disk drive in a general environment in a nonoperating state, there is the risk that the passage of air between the inside and outside of the enclosure of the disk drive, comprised of a cover and base, will lead to the entry of harmful sulfur, sulfur dioxides, and the like to the inside of the disk drive (the entry of molecules of gas due to diffusion).

Therefore, in the past, a ventilation structure (breather structure) for preventing the entry of harmful gas into the disk drive by providing the cover of the disk drive with a gas adsorption filter has been proposed. The conventional ventilation structure provided for the cover of a disk drive, however, has been complicated in construction and high in cost, so a ventilation structure of a simpler configuration and lower cost has been desired.

For example, U.S. Re. Pat. Nos. 34,497 and 5,030,260 disclose conventional disk drives providing ventilation structures at their housings or covers, but since the ventilation members with the ventilation grooves are made by separate members from the housings and covers, work has been required for assembling these separate members with the covers etc. Considering the cost of fabricating the separate members themselves, further, there is the problem that the cost of manufacturing the disk drives becomes higher.

SUMMARY OF THE INVENTION

Therefore, the object of the present invention is to provide a ventilation structure of a cover for a disk drive which makes the passage for ventilation between the inside and outside of the disk drive using the members constituting the cover itself and thereby enables ventilation between the inside and outside of the disk drive without newly increasing the number of parts and makes it possible to keep down increases in cost due to the ventilation structure.

The cover structure of the disk drive of the present invention is realized in a disk drive provided on a base with a spindle motor carrying at least one recording disk and an actuator for driving a carriage carrying at least one head for writing information on the disks, the spindle motor and actuator sealed air-tight by the cover provided on the base, and provided at the cover at the side where it contacts the outside air with an antivibration plate for preventing vibration and noise from occurring when driving the disks, by forming between the cover and antivibration plate a breather passage designed in light of the passage conductance, providing the antivibration plate at one end of the breather passage with a breather vent communicating the breather passage with the outside, and providing the cover at the other end of the breather passage with a breather vent communicating the breather passage with the inside of the disk drive.

The passage is configured by a first passage formed as at least one narrow, short groove and at least two second passages having sectional areas larger than the sectional area of the first passage. The second passages may be formed by connection with the first passage. The breather passage may be formed by indenting the cover, may also be formed by indenting the antivibration plate, and further may be formed by making a hole in the viscoelastic member.

Further, the antivibration plate is attached to the cover in a state with a viscoelastic member interposed. The portion where this viscoelastic member is superposed over the breather passage is provided with a hole of the same shape as the breather passage.

According to the cover structure of the disk drive of the present invention, by using the antivibration plate and viscoelastic member provided at the cover of a conventional disk drive to form a breather passage, including the viscoelastic member, it is possible to form a breather passage inexpensively in the cover of the disk drive between the cover and antivibration plate without adding any new members.

BRIEF DESCRIPTION OF THE DRAWINGS

The present invention will be more clearly understood from the description as set forth below with reference to the accompanying drawings, in which:

FIG. 1A is a back view of a ventilation cap showing the configuration of an example of a conventional breather passage;

FIG. 1B is a sectional view along the line D—D of FIG. 1A;

DESCRIPTION OF THE PREFERRED EMBODIMENTS

Figure 2A:
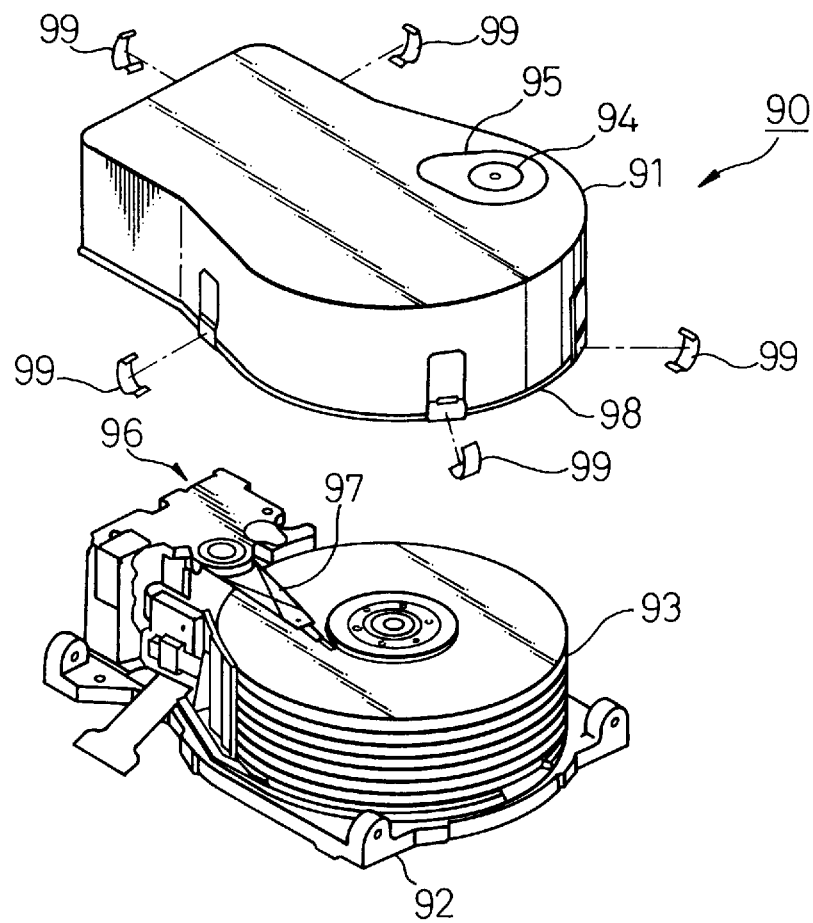
FIG. 2A is a perspective view of the configuration of a conventional magnetic disk drive provided with another example of a breather passage.

Before describing the preferred embodiments, an explanation will be given of the conventional ventilation structure of a cover for a disk drive shown in FIGS. 1 to 2B.

FIGS. 1A and 1B show the construction of the breather passage in the conventional disk drive shown in U.S. Pat. No. Re. 34,497. In particular, FIG. 1A shows the back view of a vent cap 70 and FIG. 1B shows the sectional view along the line D—D in FIG. 1A.

In FIGS. 1A and 1B, 80 is a housing of a disk drive containing a magnetic disk or an optical disk. The housing 80 is provided with vent holes 81 at a plurality of locations and a mounting hole 82 for the vent cap 70. The vent cap 70 is disk-like in shape. At the center of the surface for mounting to the housing 80, a mounting boss 71 is formed with an outwardly flaring free end. Further, around the mounting boss on the mounting surface of the vent cap 70 is formed a depressed portion 72 formed by indentation into a circle. At the mounting surface between the depressed portion 72 and the vent cap 70 is formed a narrow ventilation groove 73 concentrically with respect to the center of the cap 70. In this example of the prior art, the ventilation groove 73 is semicircular in cross-section. Reference numeral 74 shows the inlet of the ventilation groove 73 and 75 the outlet of the ventilation groove 73. The ventilation groove 73 turns back at the turnback point 76 so that the distance between the inlet 74 and outlet 75 becomes longer.

Further, as shown in FIG. 1B, inside the depressed portion provided in the attachment cap 70, a disk shaped gas adsorption filter 77 is attached by an O-ring 78 and an adhesive 79. As a result, even if harmful gas enters the inside drive from the inlet 74 of the vent cap 70, the air containing the gas passes through a narrow, long ventilation groove 73 and goes through the outlet 75 to reach the depressed portion 72 where the gas is adsorbed by the filter 77, so just the air passes through the vent hole 81 to enter inside the housing 80 of the disk drive.

Figure 2B:
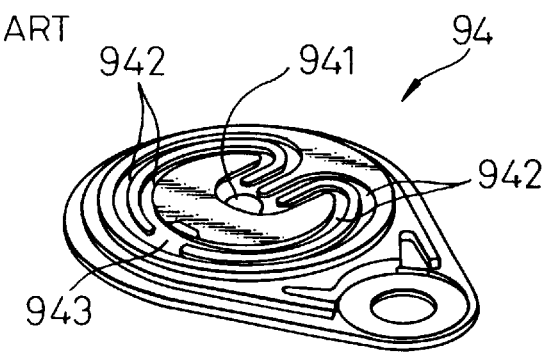
FIG. 2B is a back view of the breather passage of FIG. 2A.
Figure 9:
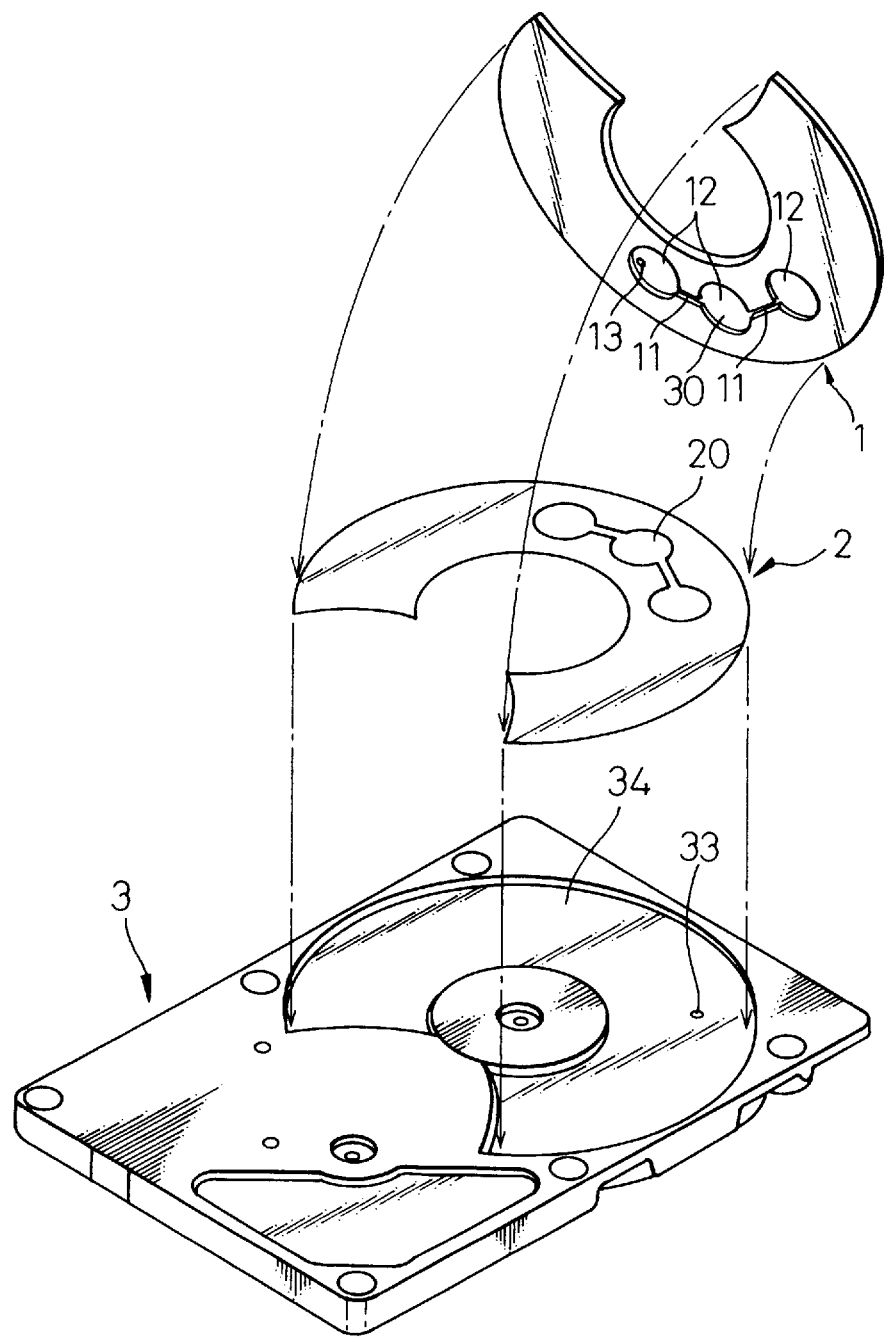
FIG. 9 is a perspective view of another embodiment of the cover structure of a magnetic disk drive of the present invention.

FIGS. 2A and 2B show the structure of another example of a breather passage in the conventional disk drive 90 shown in U.S. Pat. No. 5,030,260. FIG. 2A is a perspective view of a magnetic disk drive 90. In FIG. 2A, 9 is a cover, 92 a base, 93 a disk, 94 a breather passage assembly, 95 a tape for affixing the breather passage assembly 94 to the cover 91, 96 an actuator, 97 a head arm carrying at its front end a head, 98 a gasket, and 99 a clip for attaching the cover 91 to the base 92.

FIG. 2B is a back view of the structure of the breather passage assembly 94 of FIG. 2A. At the center of the breather passage assembly 94 is a breather vent 941. Two ventilation grooves 942 each, or a total of four, are formed from the breather vent 941 symmetrical to the left and right and converge at the convergence portion 943. The filter is provided at the bottom of the breather passage assembly 94, but is not shown here.

In the breather passage assembly 94 of the prior art, the air containing the gas entering from the breather vent 941 is passed through a narrow, long ventilation groove 942 to prevent the entry of harmful gas from the outside.

However, in the conventional breather structure disclosed in U.S. Pat. Nos. Re. 34,497 and 5,030,260, since the member provided with the ventilation groove is fabricated by a separate member from the cover of the disk drive, some work is required for assembling the separate member with the cover of the disk drive. Considering the cost of fabricating the separate member itself as well, there is the problem that the cost of manufacturing the disk drive rises.

Figure 3:
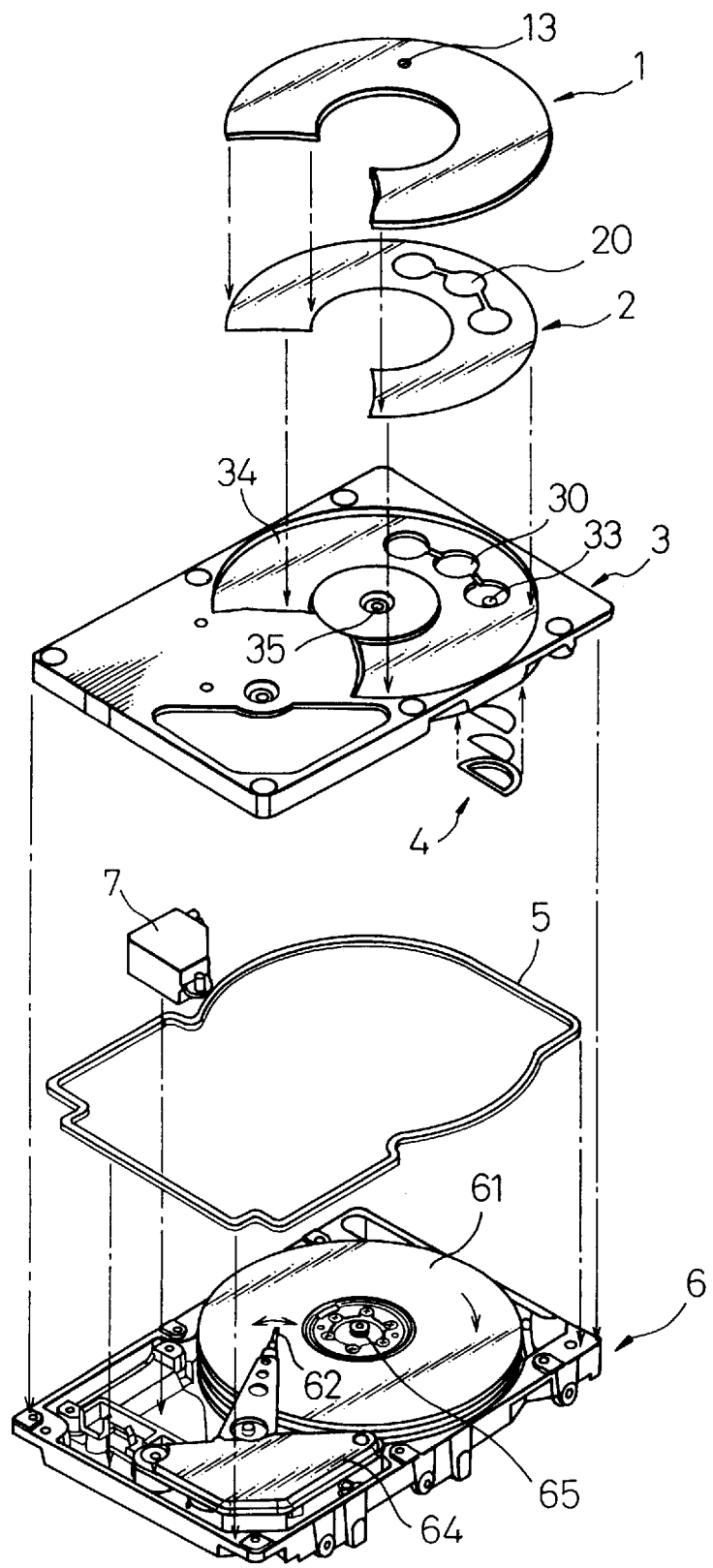
FIG. 3 is a perspective view of a magnetic disk drive showing the configuration of an embodiment of the cover structure of a magnetic disk drive of the present invention.

FIG. 3 is a perspective view of the configuration of the magnetic disk drive 10 provided with the cover structure of the embodiment of the present invention. In FIG. 3, 1 is an antivibration plate for suppressing the vibration and noise generated from the magnetic disk drive 10, 2 is a viscoelastic plate of substantially the same shape as the antivibration plate 1, 3 is a cover, 4 is a filter unit, 5 is a gasket, 6 is a base, and 7 is a desiccant unit.

Attached to the base 6 are a spindle motor 65 carrying a plurality of recording disks 61, a carriage 63 carrying the same number of heads for writing information on the disks 61 as the number of recordable disk surfaces, an actuator 64 for driving the carriage 63, etc. These spindle motor 65 and actuator 64 are sealed air-tight by the cover 3 attached to the base 6.

On the other hand, on the top surface of the cover 3 contacting the outside air, in this embodiment, a depressed portion 34 is provided at a position corresponding to the disk 61 on the base 6. The depressed portion 34 is formed by indentation in a circular ring shape about the insertion hole 35 of the shaft of the spindle motor 65 provided in the cover 3. In this depressed portion 34 is attached, through a viscoelastic member 2, an antivibration plate 1 for preventing vibration and noise from occurring when driving the disk 61.

The function of the antivibration plate 1 and viscoelastic plate 2 in the magnetic disk drive 10 is to prevent the noise generated by resonance of the cover 3 by the inherent vibration when transmitting the outer force of the source of vibration, the spindle motor 65, to the cover 3 and the base 6. That is, the energy of vibration of the cover 3 is converted to heat energy by the antivibration plate 1 and viscoelastic plate 2 attached to the cover 3 so as to suppress the noise by the vibration.

Next, an explanation will be made of the principle of prevention of noise by the antivibration plate 1 and viscoelastic plate 2. To lower the resonance point of the vibrating cover 3 and eliminate the unpleasant noise of the vibration, use is made of the mass of the antivibration plate 1. The larger the mass is made, the lower the resonance frequency, so in this embodiment the shape of the antivibration plate 1 is designed to give a large mass in the limited space. In general, the resonance frequency f is expressed by $f=(1/2\pi) \times (K/m)^{1/2}$ where K is the spring constant and m is the mass.

Further, to obtain the above effect, the materials of the antivibration plate 1 and viscoelastic plate 2 are selected as follows. First, the antivibration plate 1 has to have a high rigidity. Therefore, as a general metallic material used for the antivibration plate 1, there are aluminum plate, rolled steel plate, stainless steel, tungsten alloy, etc. Among these, considering the cost, it is preferable to use rolled steel plate (iron plate). Next, for the viscoelastic member used for the viscoelastic plate 2, it is necessary to select a material which will not degrade in performance and lose its viscoelasticity within the several years of the guaranteed lifetime of the magnetic disk drive. As such a material of the viscoelastic member, use may be made for example of SUMITOMO 3M's #4615 or NITTO DENKO's DA8350.

On the other hand, in this embodiment, a breather passage 30 designed considering the passage conductance is provided at a predetermined location of the depressed portion. This breather passage 30 is formed by further indenting the bottom surface of the depressed portion 34 and forming a much lower groove than the bottom surface of the depressed portion 34.

Further, at the portion where the viscoelastic plate 2 inserted into the depressed portion 34 is superposed on the breather passage 30, a hole 20 of the same shape as the breather passage 30 is formed. By forming a hole 20 of the same shape as the breather passage 30 at the portion where the viscoelastic plate 2 is superposed on the breather passage 30, the viscoelastic plate 2 is not exposed at the ceiling surface of the breather passage 30. Therefore, even when a harmful substance adheres to the viscoelastic plate 2, there is less production of a harmful gas from the harmful substances and the lifetime of the gas adsorption filter is extended.

Further, the antivibration plate 1 at one end of the breather passage 30 is provided with a breather vent 13 communicating with the outside. The cover 3 at the other end of the breather passage 30 is provided with a breather vent 33 communicating the breather passage 30 with the inside of the disk drive 10.

Figure 4A:
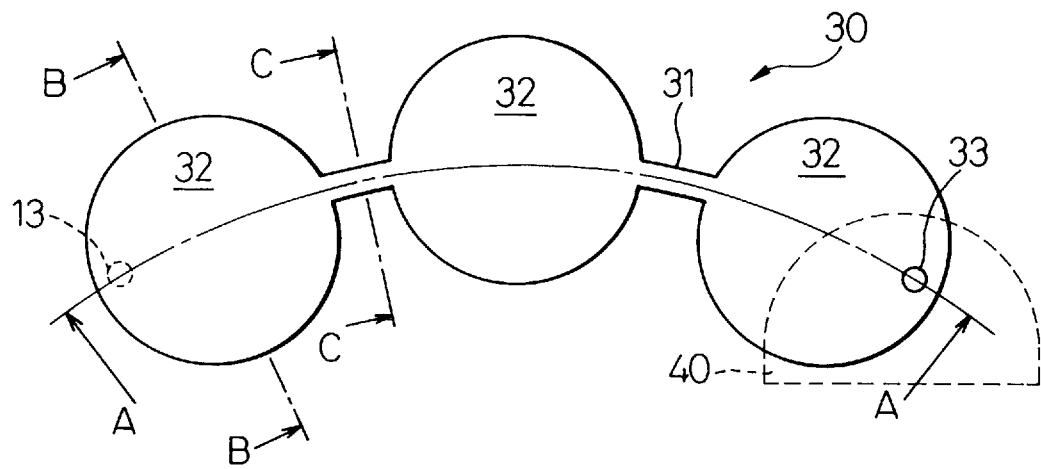
FIG. 4A is a partial enlarged plan view of the configuration of a breather passage provided in the cover of FIG. 3.
Figure 4B:
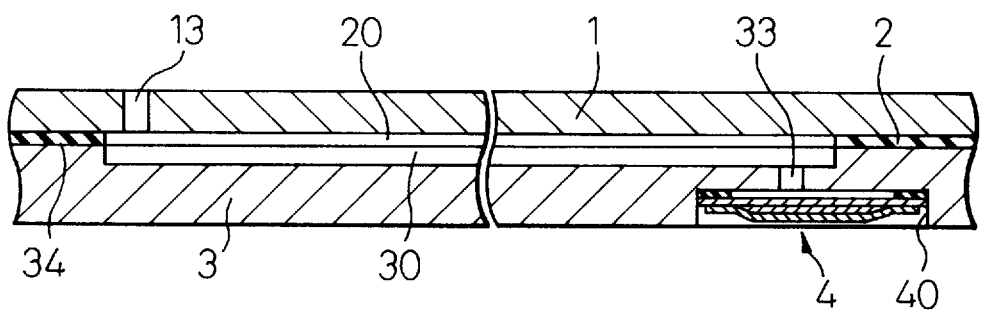
FIG. 4B is a sectional view along the line A—A of FIG. 4A.
Figure 4C:
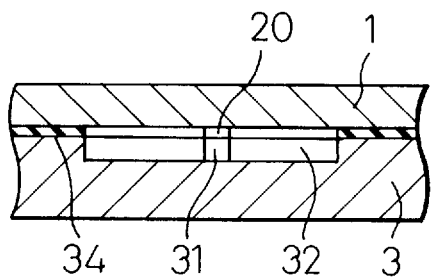
FIG. 4C is a sectional view along the line B—B of FIG. 4A.
Figure 4D:
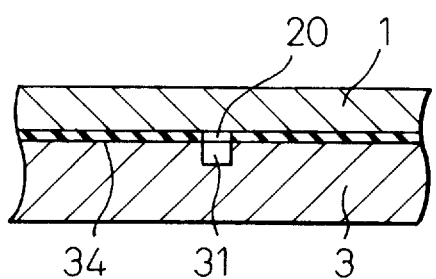
FIG. 4D is a sectional view along the line C—C of FIG. 4A.

FIG. 4A is a partially enlarged plan view of the structure of the breather passage 30 provided at the cover 3 of FIG. 3, FIG. 4B is a sectional view along the line A—A in FIG. 4A, FIG. 4C is a sectional view along the line B—B in FIG. 4A, and FIG. 4D is a sectional view along the line C—C in FIG. 4A.

The breather passage 30 in this embodiment is comprised of a first passage 31 (see FIG. 4D) formed as a narrow, short groove and second passages 32 (see FIG. 4C) having sectional areas larger than the sectional areas of the first passage 31. Further, in this embodiment, there are three circular second passages 32 in the depressed portion 34. The centers of these second passages 32 are on a concentric circle centered about the insertion hole 35 of the shaft of the spindle motor shown in FIG. 3. The first passage 31 is formed on a concentric circle centered about the insertion hole 35 of the shaft of the spindle motor shown in FIG. 3 and connects the adjoining second passages 32.

The second passage 32 at one end of the breather passage 30 is superposed on the breather vent 13 provided at the antivibration plate 1 superposed on it as shown in FIG. 4B. At the second passage 32 at the other end of the breather passage 30 is provided a breather vent 33 passing through the cover 3. At the inside of the cover 3 at the position where the breather vent 33 is provided is provided a filter attachment groove 40. A filter unit 4 is accommodated in the filter attachment groove 40. In this embodiment, the filter attachment groove 40 is a substantially D-shaped groove.

Note that when the cover 3 is made by the method of casting aluminum and is formed with step differences at the cover 3 side, since it is possible to freely change the shape of the die, the shape of the breather passage 30 is not limited to the above shape and it is possible to make any shape of passage within the limited space.

Figure 5:
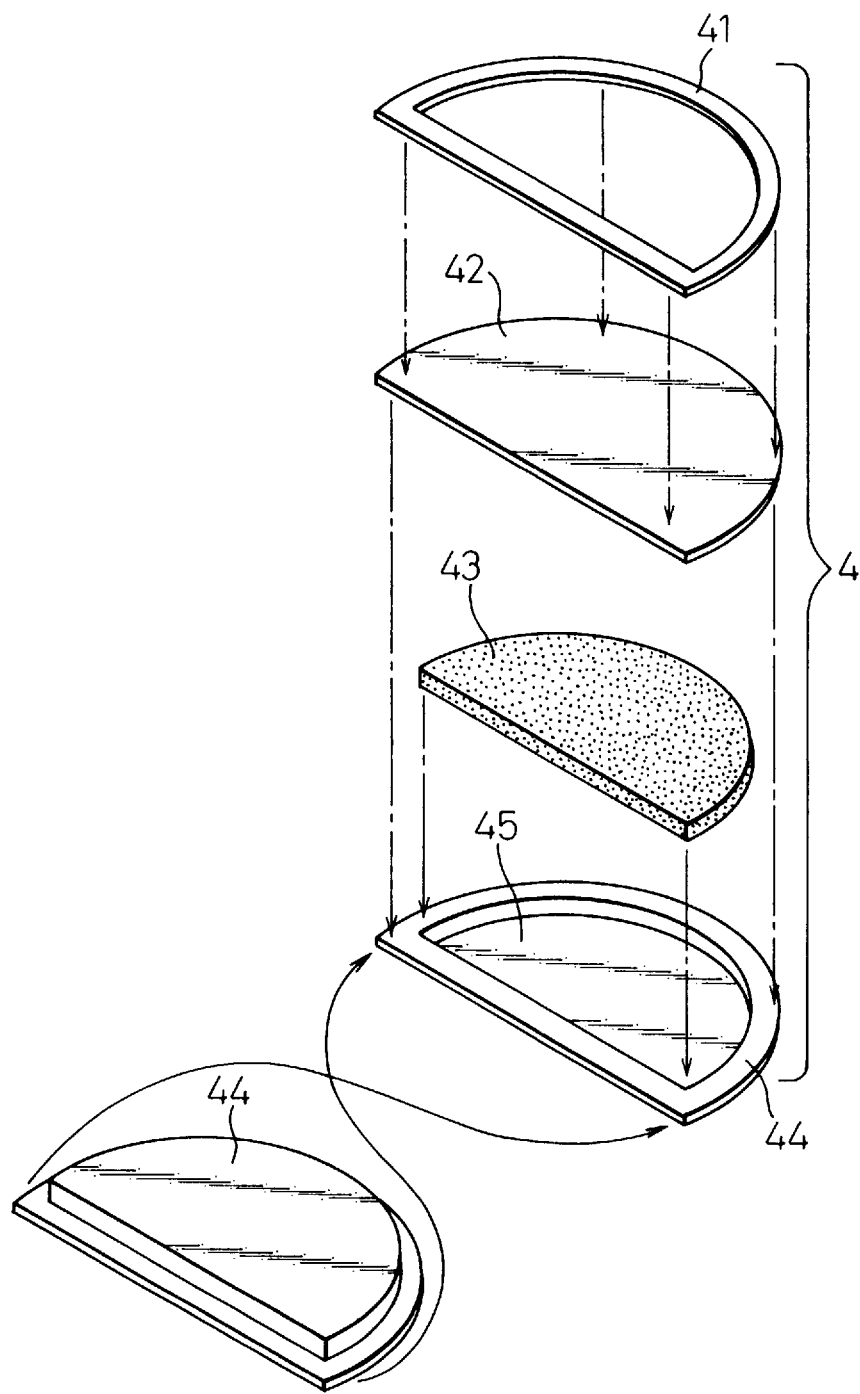
FIG. 5 is a perspective view of the construction of the filter provided at the rear surface of the cover of FIG. 3.

FIG. 5 is a perspective view of the configuration of the filter unit 4 accommodated in the filter attachment groove 40 provided at the rear surface of the cover 3. The filter unit 4 is comprised of two-sided tape 41 adhered to the bottom surface of the filter attachment groove 40, a PET sheet 42, a gas adsorption filter, that is, the chemical filter 43, and a filter 44 for removal of dust. The two-sided tape 41 forms a D-shape and is provided with a predetermined width so as to attach only the edges of the PET sheet 42. FIG. 5 facilitates understanding of the shape of the dust removal filter 44 by showing the dust removal filter 44 upside down, but also shows a correctly oriented dust removal filter 44. There is only one dust removal filter 44 used in the filter unit 4. The two-sided tape 41, the PET sheet 42, the chemical filter 43, and the dust removal filter 44 are stacked in that order and accommodated in the filter attachment groove 40 provided at the rear surface of the case as shown in FIG. 4B.

Accordingly, the air entering the case 3 through the breather vent 33 will always pass through the filter unit 44. Therefore, even if the air passing through the filter unit 44 contains gas harmful to the disk, the gas is trapped (adsorbed) by the chemical filter 43 and will not enter the case 3.

Figure 6A:
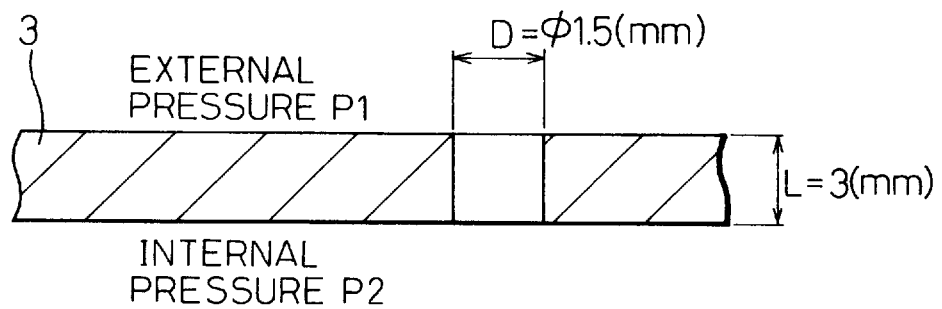
FIG. 6A is an explanatory view of a conventional passage conductance.
Figure 6B:
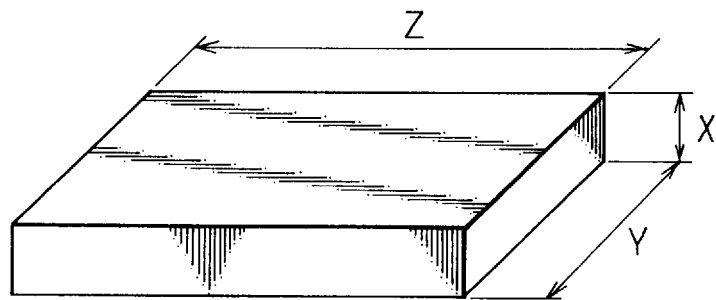
FIG. 6B is an explanatory view of the passage conductance of the present invention.

FIG. 6A is a view explaining the conventional breather vent, while FIG. 6B is a view explaining the breather passage of the present invention. In general, when a gas flows in or flows out through a passage by diffusion, the flowing speed thereof is in proportion to the A/L where A is a cross sectional area of the passage and L is a length of the passage. Namely, a smaller amount of harmful gas enters the disk drive when the cross sectional area A is smaller and the length of the passage L is larger.

As shown in FIG. 6A, when a hole of a diameter of 1.5 mm is made in the cover 3, the A/L becomes as follows:

$A_1/L_1 = 1.5^2/4 \times \pi/3 = 0.59$

Further, as shown in FIG. 6B, the A/L becomes as follows where a rectangular breather passage of a height X, width Y, and length Z is formed in the cover 3 and when X=0.2 mm, Y=5 mm, and Z=30 mm:

$A_2/L_2 = 0.2 \times 5/30 = 0.033$

When comparing the breather passage having the volume of the present invention with the conventional passage, it is possible to reduce the entry of the harmful gas reaching the filter unit 4 to approximately one eighteenth and possible to extend the lifetime of the chemical filter (gas adsorption filter) 43 of the filter unit approximately eighteen times.

Figure 7:
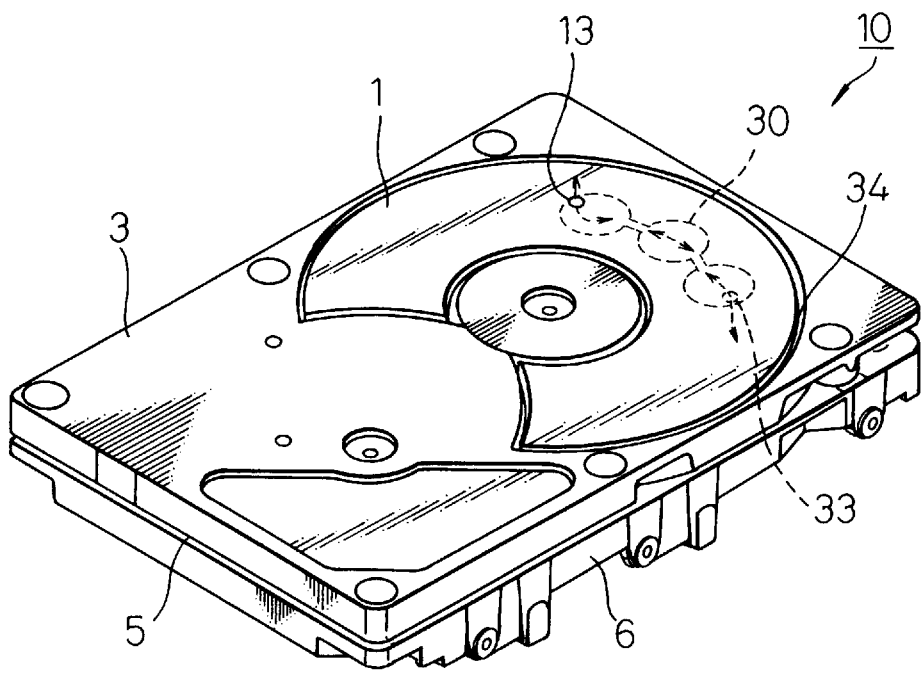
FIG. 7 is a view of the overall configuration of a magnetic disk drive provided with the cover structure of the present invention.

FIG. 7 shows the overall configuration of the magnetic disk drive provided with the cover structure of the present invention shown in FIG. 3 in the assembled state. The cover 3 and the base 6 are connected in an air-tight state via a gasket 5. An antivibration plate 1 is attached in the depressed portion 34 provided at the top surface of the cover 3. In this state, the breather vent 13 provided in the antivibration plate 1 is communicated with one end of the breather passage 30 provided between the antivibration plate 1 and the cover 3. The breather vent 33 provided at the cover 3 is communicated with the inside of the cover 3 and the other end of the breather passage 30. Accordingly, the inside of the magnetic disk drive 10 is communicated to the outside through the breather vent 33, breather passage 30, and breather vent 13 as shown by the dotted line in FIG. 7.

Further, even when air containing gas harmful to the disk enters the breather passage 30 from the breather vent 13, since the breather passage 30 is shaped so that the passage conductance becomes smaller, the harmful gas has a hard time traveling to the breather vent 33 at the other end of the breather passage 30. Further, even when the harmful gas reaches the breather vent 33, the harmful gas entering the inside of the case 3 through the breather passage 33 is trapped by the filter (not shown) provided at the inside of the position where the breather vents 33A and 33B of the case 3 are provided, so the disk at the inside of the case 3 is not damaged by the harmful gas.

Figure 8:
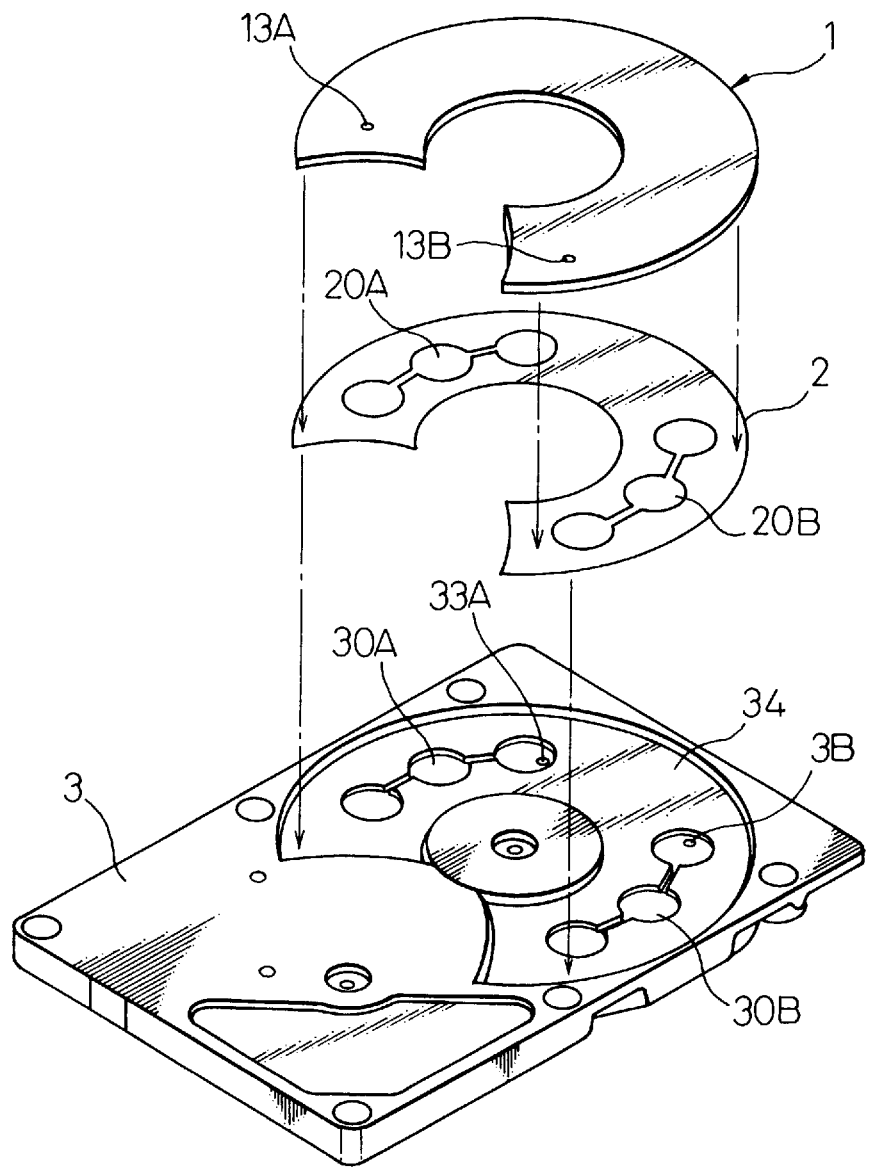
FIG. 8 is a perspective view of another embodiment of the cover structure of the magnetic disk drive of the present invention.

FIG. 8 shows the cover structure of another embodiment of the present invention. This figure shows only the antivibration plate 1, viscoelastic plate 2, and cover 3. In the embodiment explained in FIG. 3 to FIG. 7, only one breather passage 30 was provided between the cover 3 and antivibration plate 1. On the other hand, the point of difference of the cover structure of this embodiment from the above embodiment is the fact that two breather passages 30A and 30B are provided between the cover 3 and antivibration plate 1.

The configuration of the breather passages 30A and 30B is the same as the configuration of the above breather passage 30. At one ends of the breather passages 30A and 30B are provided breather vents 33A and 33B communicating with the inside of the case 3. Further, the viscoelastic plate 2 interposed between the cover 3 and antivibration plate 1 is provided with vents 20A and 20B of shapes corresponding to the breather passages 30A and 30B corresponding to the same. The antivibration plate 1 is provided with breather vents 13A and 13B at corresponding positions at the other end of the breather passages 30A and 30B.

In the magnetic disk drive provided with the cover structure of this embodiment, when the amount of breathing inside and outside the case 3 in the nonoperating state of the magnetic disk drive is the same, the amount of air passing through the breather passages 30A and 30B becomes half that of the case where only one breather passage 30 is provided. As a result, the lifetime of the filter at the inside of the position where the breather vents 33A and 33B of the case 3 are provided becomes double.

FIG. 9 shows the cover structure of still another embodiment of the present invention. This figure also shows just the antivibration plate 1, viscoelastic plate 2, and cover 3. In the embodiment explained with reference to FIG. 2 to FIG. 7, the breather passage 30 was provided by indenting the depressed portion 34 accommodating the antivibration plate 1 provided at the top surface of the cover 3. On the other hand, the point of difference of the cover structure of this embodiment from the above embodiment is that the breather passage 30 is provided by indenting the bottom surface of the antivibration plate 1.

The breather passage 30 may be shaped the same as in the embodiment explained with reference to FIG. 3 to FIG. 7. It is comprised of the first passage 11 and second passages 12 and has a breather vent 13 provided at one end. The antivibration plate 2 is structured the same as in the embodiment explained with reference to FIG. 7. Only a breather vent 33 is provided in the depressed portion 34 of the cover 4 at a position located at the other end of the breather passage 30. The effect of this embodiment is the same as in the embodiment explained with reference to FIG. 3 to FIG. 7.

Note that in the embodiment explained above, the breather passage 30 is provided at the two sides of the cover 3 and viscoelastic member 2 or antivibration plate 1 and viscoelastic plate 2, but when the viscoelastic plate 2 is provided with a predetermined thickness, the breather passage 30 may also be provided only in the viscoelastic plate 2.

Figure 10:
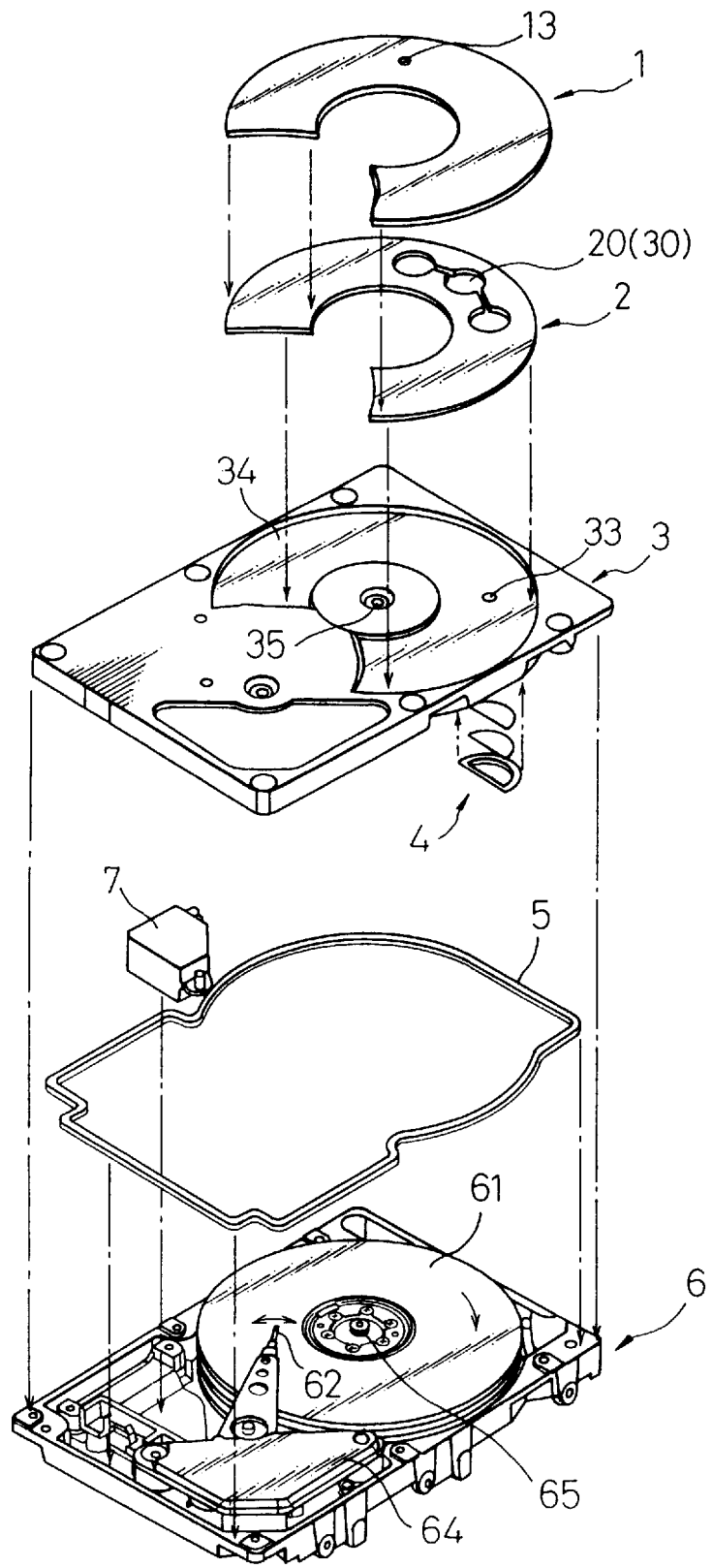
FIG. 10 is a perspective view of a magnetic disk drive of a modification of the embodiment shown in FIG. 3 providing the breather passage only at the viscoelastic member.
Figure 11:
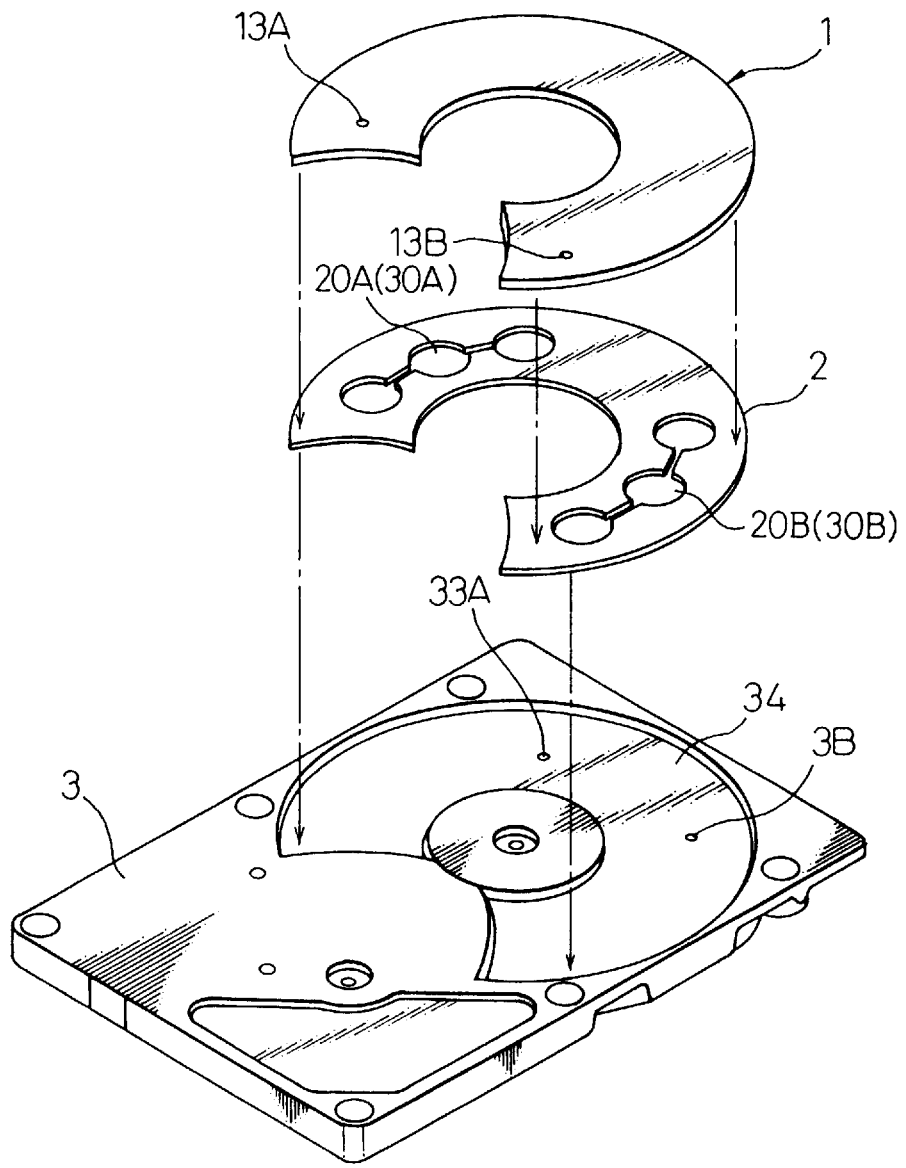
FIG. 11 is a perspective view of a magnetic disk drive of a modification of the embodiment shown in FIG. 8 providing the breather passage only at the viscoelastic member.
Figure 12:
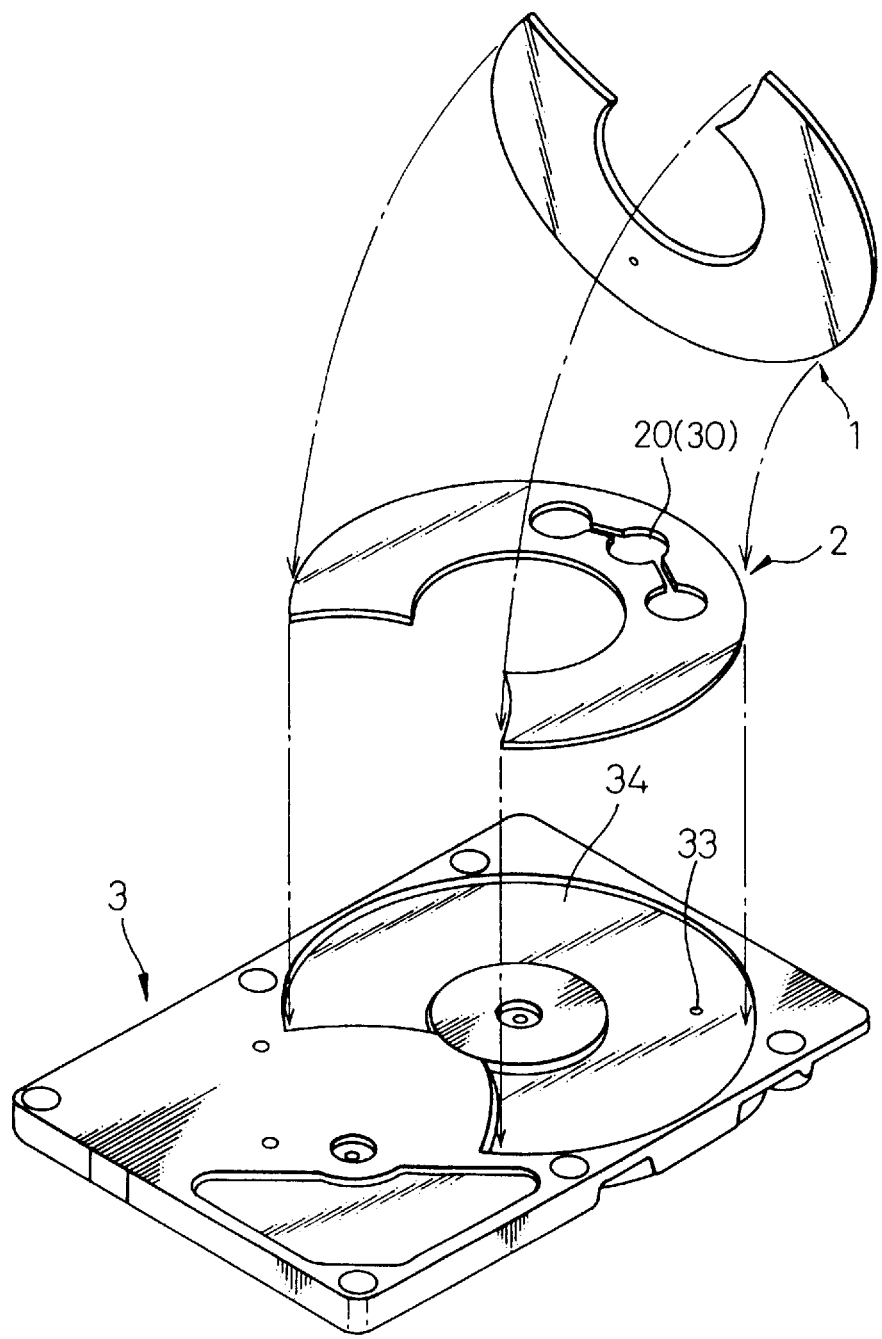
FIG. 12 is a perspective view of the magnetic disk drive of a modification of the embodiment shown in FIG. 9 providing the breather passage only at the viscoelastic member.

FIG. 10 shows a modification of the embodiment explained with reference to FIG. 3 wherein the breather passage 30 is replaced by a hole 20 provided in the viscoelastic member 2. Further, FIG. 11 shows a modification of the embodiment explained with reference to FIG. 8 where the breather passages 30A and 30B are replaced by the holes 20A and 20B provided in the viscoelastic member 2. Still further, FIG. 12 is a perspective view of the magnetic disk drive showing a modification of the embodiment explained with reference to FIG. 9 where the breather passage 30 is replaced by a hole 20 provided in the viscoelastic member 2. The configuration of the other members shown in FIGS. 11, 12, and 13 were already explained with reference to FIGS. 3, 8, and 9, so explanations will be omitted here.

Further, in the embodiments explained above, the explanation was made taking as an example a magnetic disk drive, but the cover structure of the disk drive of the present invention can also be applied to the cover structure of an optical disk drive or other disk drive.

As explained above, according to the present invention, since a passage for breathing between the inside and outside of the disk drive is fabricated using parts constituting the cover of the disk drive in the past and therefore the number of parts is not newly increased, work for newly attaching a breather mechanism at the time of assembly the disk drive becomes unnecessary and it is possible to suppress an increase in cost due to the breather mechanism between the inside and outside of the disk drive.

What is claimed is:

1. A ventilation structure providing ventilation between interior and exterior portions of a disk drive provided on a base with a spindle motor carrying at least one recording disk and an actuator for driving a carriage carrying at least one head for writing information on the disk, the spindle motor and actuator sealed air-tight by a cover provided on the base, the cover being provided with an anti-vibration plate at a side where the cover contacts the exterior air, anti-vibration plate preventing vibration and noise from occurring when the disk is being said ventilation structure comprising:

a sheet-shaped viscoelastic member interposed between the antivibration plate and the cover;

a breather passage for reducing air flow through the disk drive unit, said breather passage being defined in said viscoelastic member;

a first breather vent defined in said anti-vibration plate at one end of said breather passage and communicating said breather passage with the exterior air; and a second breather vent defined in said cover at the other end of said breather passage and communicating said breather passage with the interior portion of the disk drive;

wherein said viscoelastic member in combination with said anti-vibration plate preventing vibration from occurring when the disk is being driven.

2. A ventilation structure as set forth in claim 1, where said breather passage includes an indented portion of the cover.

3. A ventilation structure as set forth in claim 2, where said breather passage comprises:

a first passage formed as at least one narrow, short groove; and at least two second passages connected by said first passage and having a sectional area larger than the sectional area of said first passage.

4. A ventilation structure as set forth in claim 3, where said first passage is a groove running along the inside of the cover and parallel to a recording track of the recording disk positioned and said second passages are circular grooves with centers positioned on a concentric circle of said first passage.

5. A ventilation structure as set forth in claim 1, where said breather passage includes an indented portion of said anti-vibration plate.

6. A ventilation structure as set forth in claim 5, where said breather passage comprises:
   a first passage formed as at least one narrow, short groove; and
   at least two second passages connected by said first passage and having a sectional area larger than the sectional area of said first passage.

7. A ventilation structure as set forth in claim 6, where said first passage is a groove running along the inside of the cover and parallel to a recording track of the recording disk positioned at the inside of the cover and said second passages are circular grooves with centers positioned concentrically with said first passage.

8. A ventilation structure providing ventilation between interior and exterior portions of a disk drive provided on a base with a spindle motor carrying at least one recording disk and an actuator for driving a carriage carrying at least one head for writing information on the disks, the spindle motor and actuator being sealed air-tight by a cover provided on the base, the cover being provided with an anti-vibration plate at a side where the cover contacts the exterior air, said ventilation structure comprising:
   a viscoelastic member interposed between the cover and the anti-vibration plate preventing vibration from occurring when the disks are driven;
   a breather passage defined in said viscoelastic member;
   a first breather vent defined in said anti-vibration plate at one end of said breather passage and communicating said breather passage with the outside air; and
   a second breather vent defined in the cover at the other end of said breather passage and communicating said breather passage with the inside of the disk drive;
   wherein said viscoelastic member is provided with a hole facilitating communication of air between said first breather vent and said second breather vent.

9. A ventilation structure as set forth in claim 8, where said breather passage is comprised of the following:
   a first passage formed as at least one narrow, short groove; and
   at least two second passages connected by said first passage and having a sectional area larger than the sectional area of said first passage.

10. A ventilation structure as set forth in claim 9, where said first passage is a groove running parallel to a recording track of the recording disk positioned at the inside of the cover, and said second passages are circular grooves with centers positioned concentrically with said first passage.

11. A ventilation structure providing ventilation between interior and exterior portions of a disk drive provided on a base with a spindle motor carrying at least one recording disk and an actuator for driving a carriage carrying at least one head for writing information on the disk, the spindle motor and actuator sealed air-tight by a cover provided on the base, the cover being provided with an anti-vibration plate at a side where the cover contacts the exterior air, the anti-vibration plate being attached to the cover in a state with a viscoclastic member interposed therebetween thereby preventing vibration and noise from occurring when the disk is being driven, said ventilation structure comprising:
   a breather passage defined within one of said cover, said anti-vibration plate and said viscoelastic member, said breather passage comprising a first passage formed as at least one narrow, short groove, and at least two second passages connected by said first passage and having a sectional area larger than the sectional area of said first passage;
   a first breather vent defined in said anti-vibration plate at one end of said breather passage and communicating said breather passage with the exterior air; and
   a second breather vent defined in said cover at the other end of said breather passage and communicating said breather passage with the interior portion of the disk drive;
   said viscoclastic member having a hole facilitating communication between said first breather vent and said second breather vent, wherein said first passage is a groove running along a recording track of the recording disk, and said second passages are circular grooves with centers positioned concentrically with said first passage.

* * * * *

UNITED STATES PATENT AND TRADEMARK OFFICE
CERTIFICATE OF CORRECTION

PATENT NO. : 5,877,915
DATED : March 2, 1999
INVENTOR(S) : Katsuaki Ishida

It is certified that error appears in the above-identified patent and that said Letters Patent is hereby corrected as shown below:

Column 8, line 30, delete "anti-vibration plate preventing vibration and noise from occurring when the disk is being"

Signed and Sealed this

Eighth Day of February, 2000

Attest:

Q. TODD DICKINSON

*Attesting Officer*  *Commissioner of Patents and Trademarks*